United States Patent
Baumgarten et al.

(10) Patent No.: US 6,932,697 B2
(45) Date of Patent: Aug. 23, 2005

(54) METHOD AND DEVICE FOR SEPARATING A FLOW OF CROPS

(75) Inventors: Joachim Baumgarten, Beelen (DE); Bernd Holtmann, Sendenhorst (DE); Hendrik Scholle, Herford (DE); Heinz Peters, Warendorf (DE)

(73) Assignee: Claas Selbstfahrende Erntemaschinen GmbH, Harsewinkel (DE)

( * ) Notice: Subject to any disclaimer, the term of this patent is extended or adjusted under 35 U.S.C. 154(b) by 0 days.

(21) Appl. No.: 10/782,124

(22) Filed: Feb. 19, 2004

(65) Prior Publication Data

US 2004/0226275 A1 Nov. 18, 2004

(30) Foreign Application Priority Data

Feb. 21, 2003 (DE) .......................... 103 07 705

(51) Int. Cl.⁷ .......................... A01D 75/18; A01F 12/16; A01F 21/00
(52) U.S. Cl. .......................... 460/1
(58) Field of Search .............. 460/7, 1, 6, 5, 460/150; 56/10.2 R, 10.2 C, 10.2 B, 10.2 G, 11.9, 14.6, DIG. 15

(56) References Cited

U.S. PATENT DOCUMENTS

| | | | | |
|---|---|---|---|---|
| 3,935,866 A | * | 2/1976 | Northup et al. ........... | 460/4 |
| 4,296,409 A | * | 10/1981 | Whitaker et al. ......... | 340/684 |
| 4,337,611 A | * | 7/1982 | Mailander et al. ....... | 460/7 |
| 4,360,998 A | * | 11/1982 | Somes ......................... | 460/5 |
| 4,458,471 A | * | 7/1984 | Herwig ....................... | 56/10.2 G |
| 4,513,562 A | * | 4/1985 | Strubbe ...................... | 56/10.2 G |
| 4,934,985 A | | 6/1990 | Strubbe | |
| 4,951,031 A | * | 8/1990 | Strubbe ...................... | 340/684 |
| 5,015,997 A | * | 5/1991 | Strubbe ...................... | 340/684 |
| 6,475,081 B2 | * | 11/2002 | Coers et al. ................ | 460/7 |
| 6,487,836 B1 | * | 12/2002 | Coers et al. ............. | 56/10.2 B |

FOREIGN PATENT DOCUMENTS

DE          2 106 930      11/1971

* cited by examiner

Primary Examiner—Árpád F. Kovács
(74) Attorney, Agent, or Firm—Michael J. Striker

(57) ABSTRACT

A flow of crops, which contains useful material and waste material, is separated in a crop machine into a useful material flow and a waste material flow, in which, respectively, the useful material or the waste material is concentrated. A first step separates the flow of crops with a first selectivity into a pre-cleaned flow, which contains a substantial portion of the useful material and a remaining portion of the waste material, and a first waste material flow, which contains a substantial portion of the waste material and a remaining portion of the useful material. A second step separates the pre-cleaned flow with a selectivity dependent on its flow rate into the useful material flow and a second waste material flow, which contains a substantial portion of waste material and a remaining portion of the useful material. A quantity combined from the amount of the useful material into the waste material flow is detected continuously, and the first selectivity is regulated based on this quantity, independently from the flow rate of the flow of crops (S3, S4).

27 Claims, 6 Drawing Sheets

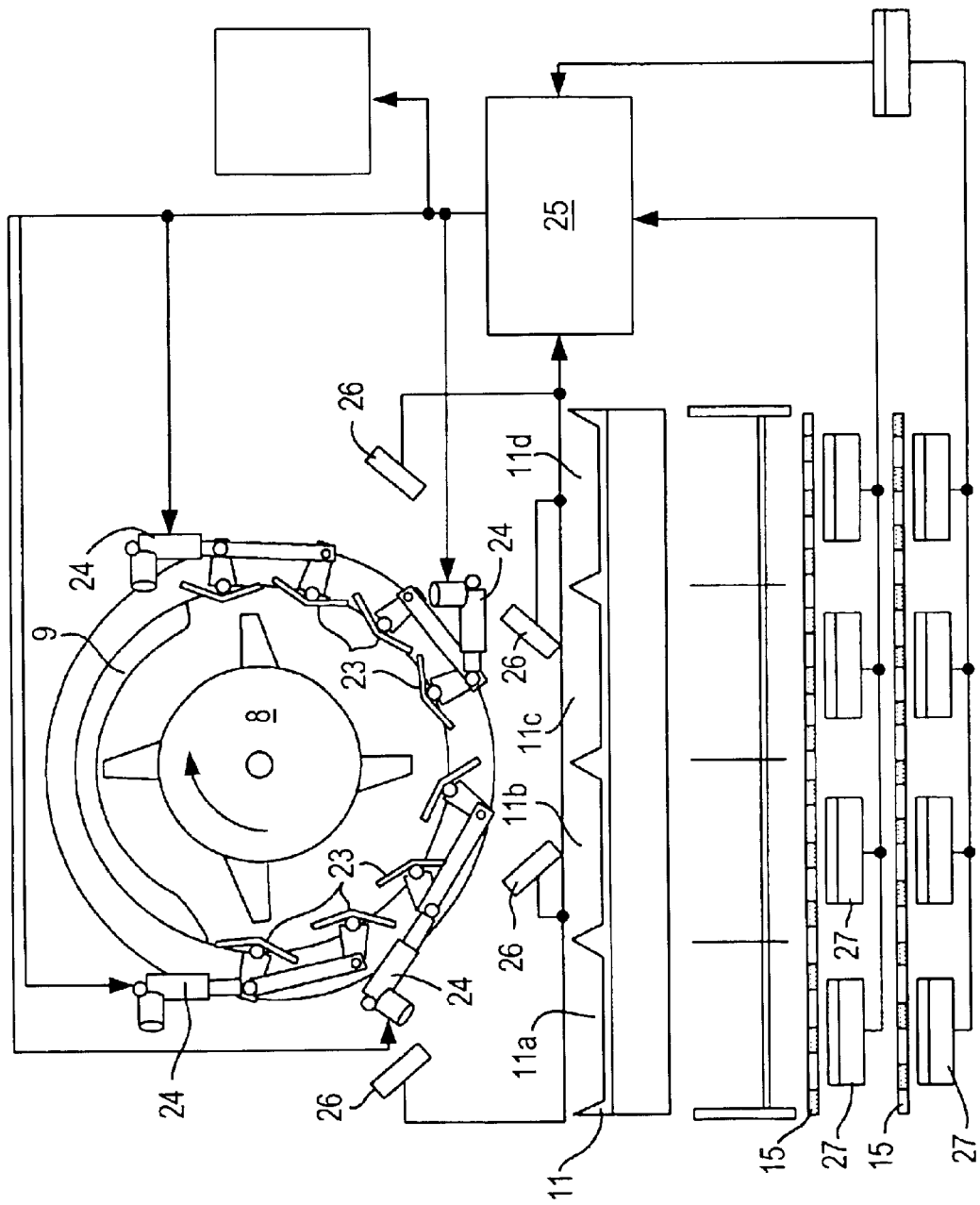

METHOD AND DEVICE FOR SEPARATING A FLOW OF CROPS

BACKGROUND OF THE INVENTION

The present invention relates to a method and a device for separating a flow of crops, which contains at least two material parts, designated as useful material or waste material, into a useful material flow and a waste material flow, in which, respectively, the useful material or waste material is concentrated.

Each separating process is a compromise between three specifications running counter to one another. A high flow rate of the separating method is necessary, in order to use efficiently the utilized resources, such as machines and labor and to maintain the costs of the separation at a minimum. With increasing flow rate, however, the selectivity of the separation is reduced. A high selectivity of the separation means, on the other hand, that the portion of useful material, which is moved into the waste material flow, should be as small as possible. That means that the useful material contained in the flow of crops should be obtained as completely as possible. On the other hand, the smallest possible waste material should be contained also in the useful material flow. Minimal waste of useful material generally can be achieved only when it is accepted that waste material is moved into the useful material flow, which, in turn, detrimentally affects the further ability to process and the value of the useful material so obtained. A high purity of the useful material flow must be purchased generally with losses of useful material.

In order to coordinate these counter specifications, it has been proven advisable to perform separating methods in two steps, in which in a first separating step, a pre-cleaned flow is produced, in which the useful material is maintained as completely as possible, and likewise, the remaining portion of waste material is accepted. It is important that the flow rate of the pre-cleaned flow is substantially reduced in comparison to the original flow of crops, so that the second separating step, which is applied to the most complete separation of the waste material as possible, can be effectively performed.

A two-stage separation of grain and non-grain material is prevalent with harvest combines. As an example, reference is made to U.S. Pat. No. 4,934,985, which describes a combine, in which a first separating step, with the aid of a threshing cylinder and separator cylinders, separating the flow of crops into straw, which is discarded, and flow containing grain and chaff, that is, spelt and fine stalk fragments, which are cleaned subsequently in a second separating step.

The separation of the pre-cleaned flow takes place in the common manner via so-called separating cages, in the form of perforated sheets or sieves, which are associated with a rotor, respectively, and which lets pass the grain-chaff mixture forming the pre-cleaned flow, while the straw is conveyed further by the rotor and finally thrown out. These separating cages are formed as sheet cages, that is, sheets, in which holes are applied with a fixed size specified for desired crops, or as a wire cage, which are formed by bars arranged in defined distances and provided with bores and wires, which are guided through the bores. The geometry of the openings is unchanging with all of these separating cages. An adaptation to the requirements of different thrashed fruit is therefore possible not only by an exchange of the separating cages or by changing their opening geometry, in which, for example, additional bars or sheets are screwed in. Such an adaptation is very time-consuming and when multiple separating cages must be held ready with different hole dimensions, it can also be very expensive.

However, if adapted cages are used always on the thrashed fruit to be processed, generally, an optimal separating result is not achieved with the actual technology. The basis for this is the qualities of the crop materials themselves, which can differ greatly, in particular, depending on their moisture. When one accepts that the first separating step is well adapted to a two-stage separating device to a selected crop with a specific degree of moisture, so that it can be operated with a high flow rate of the crops and run a pre-cleaned flow with a minimal waste portion, then generally, the second separating stage is not efficiently dimensioned based on economical grounds as is necessary to processing this pre-cleaned flow. If the crops are drier, then this facilities the separation in the first stage, so that this could be driven, in principle, with a higher flower rate, without increasing the useable material portion in its waste material flow over a permitted amount. With increasing drying, the crops, however, are subject also to increased formation of small fragment pieces, which are moved into the pre-cleaned flow and increased its waste material portion. An increased flow rate of the first separating stage therefore leads to an over-proportional increase of the flow rate, which must be processed by the second separating stage. This can be easily overloaded, therefore, with the result that its purification action is insufficient or can be achieved only with acceptance of a high loss of useable material. Generally, one can determine that the common two-stage separating methods and devices only achieve an optimal efficiency for a predetermined degree of dryness of the crops, in which both stages are working at their upper capacities. If the drying is stronger, the first stage must be driven beneath its capacity, in order not to overload the second. With a higher degree of moisture, this is reversed.

A combine with devices for detecting grain loss, which are arranged on a waste material flow, is known from DE 21 06 930 C3. The detection results of these devices are used in order to regulate the speed of the combine automatically or to produce a command for regulating the speed for the driver of the combine.

An object of the present invention is to provide a method and device for at least a two-stage separating of a flow of crops into a useable material flow and a waste material flow, which also makes possible with changing qualities of the flow of crops an operation of both stages at their upper capacities, and therewith, makes possible an optimal efficiency.

The object is solved by the method and device of the present invention. By regulating the selectivity of the first separating stage, the flow rate of the pre-cleaned flow processed by the second separating stage can be affected. This means that when the flow of crops to be processed is drier than an actual adjustment of the selectivity of the first stage, then by increasing the selectivity, the flow rate of the second stage can be reduced and so an overloading can be avoided.

In order to recognize an overload, at least one quantity combined with the amount of useable material into the waste material flows must be detected. Preferably, this is differently separated for each of the two waste material flows. Thus, also, a simultaneous overloading of both stages can be recognized and by reducing the flow rate of the flow of crops supplied to the first stage, counteracted.

Preferably, the amount of useable material contained in a waste flow is directly detected by measuring the waste material flow after the separating step. For example, this can occur in an acoustic way by detection of impact noise of the waste material flow, which is different for grains and blades contained in the flow.

Another possibility is to detect the amount of useable material contained in the waste material flow by measuring the material flow rate of the separating step that provides the waste material flow, whereby, then, the amount of lost useable material, for example, can be deduced with the aid of an empirically determined table or function.

A further possibility is to separate still a remaining, residual material flow in a second separating step in addition to the second waste material flow and the useable material flow, whose material could not be safely separated into useable material and waste material, and to detect the material flow rate of this residual flow.

Preferably, the selectivity of the first separating step is regulated, such that an equal portion of useable material is implemented in both waste material flows.

An adaptation of the selectivity of the separation to the detected portion of useable material into the waste material flows can take place fully automatically, or it can be produce a command to a user of the machine, that the selectivity should be increased or lowered, whereby it rests with the user to provide a corresponding adjustment.

When the useable material portion in both waste material flows exceeds a threshold value, this is then an instruction that both separating stages are overloaded and that the flow rate of the flow of crops should be reduced. In the reverse, in order to make possible an effective operation, the flow rate of the crops should be increased when the portion of a useable material in both waste material flows falls below a threshold value. When the invention is used on a drivable crop machine, it is recommend to increase or reduce the flow rate of the flow of crops by adapting the speed of the crop machine.

A preferred possibility is to automatically control the speed of the crop machine with reference to the detected useable material portion, in order release the driver of the machine from this responsibility. In order to avoid an unexpected acceleration and braking of the machine, it is also possible, however, merely to produce an instruction to the driver of the harvesting machine that the speed can be increased or reduced.

BRIEF DESCRIPTION OF THE DRAWINGS

Further features and advantages of the present invention are provided in the following description of an embodiment with reference to the attached figures.

FIG. 3 shows a cross section through the combine in the height of lines III—III from FIG. 1;

DETAILED DESCRIPTION OF THE PREFERRED EMBODIMENTS

Figure 1:
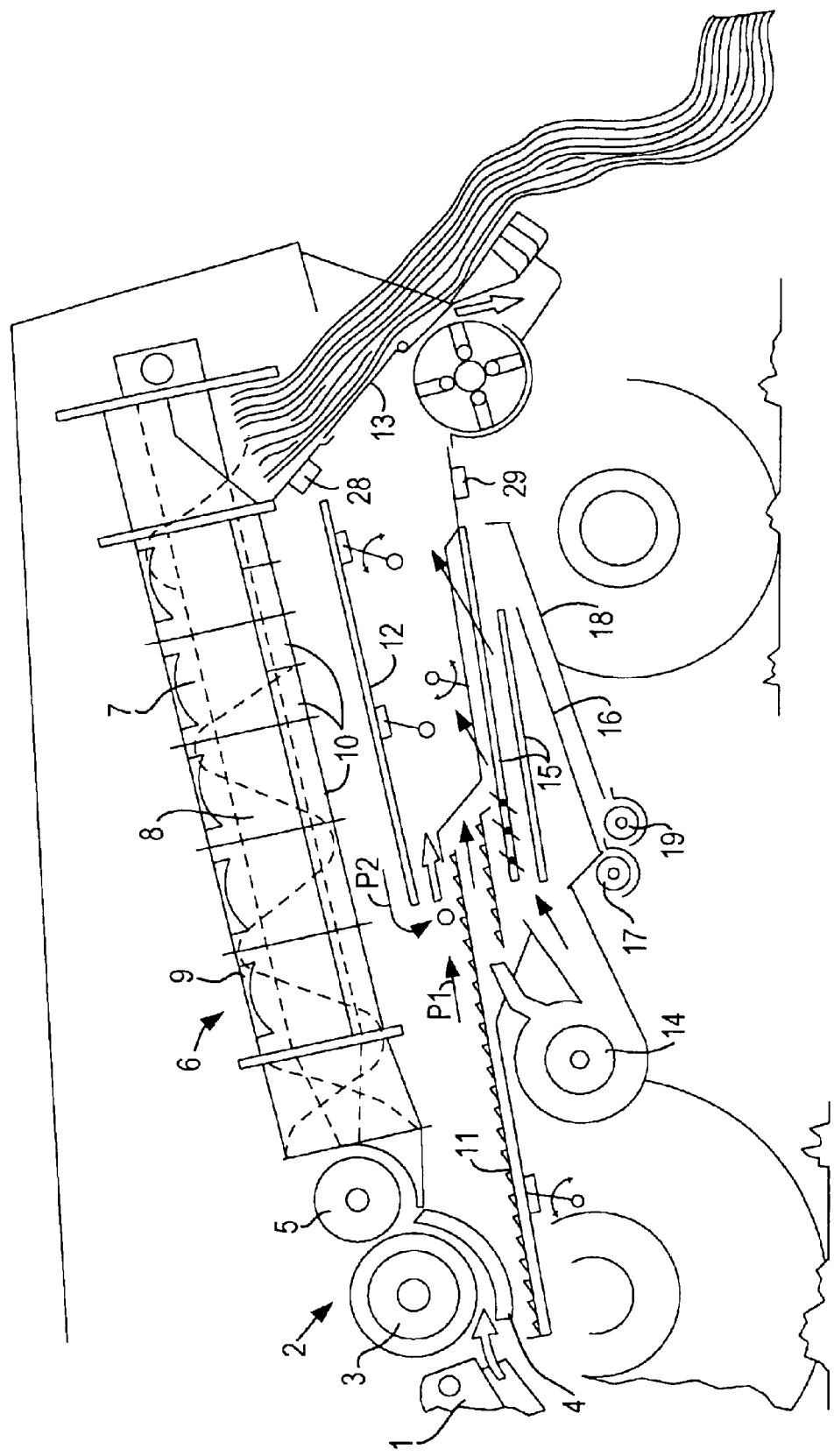
FIG. 1 shows a schematic section through a combine, on which the present invention can be realized.

FIG. 1 shows a schematic section through the back region of a combine as an example for a separating device of the present invention. With such a combine, a flow of crops to be separated is formed by a mown crop in a flow of crops to be separated, and the goal of the separation is to obtain a useable material flow, which contains the grain in the purest possible form, and a waste material flow of non-grain components. In a front region (not shown) of the combine, the mown crop is removed from a mowing table and supplied from a transporter 1 (shown only in a sectional representation) to a tangentially operating threshing device 2. The threshing device 2 is constructed essentially from a threshing drum 3 with an axis oriented transverse to the driving direction of the combine, which is equipped on its outer mantle with friction elements and is surrounded on a part of its circumference by a threshing cage 4. A part of the grains separated from the stalks in the threshing device 2 falls through holes of the threshing cage 2 onto a conveyor floor 11, on which these, as specified by an arrow P1, are conveyed counter to the driving direction of the combine by means of shaking movements.

The main flow of the mown goods, however, is guided through the threshing drum 3 and threshing cage 4 and supplied with support of a conducting drum 5 to a separating device 6.

The threshing device 6 here is illustrated purely in an exemplary manner as a cylindrical housing 7 open on its end, which over its entire length, a conveying element 8 is supported to be rotatably driven. By the rotation of the conveying element 8, the mown goods are conveyed from a spirally formed track through the separating device 6. From a top side of the housing 7 into the interior, projecting ribs 9 facilitate a through-kneading of the mown goods, when the outer edge of the helix of the conveying element 8 brushes against it. The slope or incline of the ribs 9 with reference to the conveying direction of the mown goods in the housing 7 is adjustable. In this manner, the conveying speed of the mown goods in the separating device 6 can be varied. The conveying speed must be large enough so that at the entry of the separating device 6, no stoppage occurs; on the other hand, it should be as small as possible, in order to achieve a long retention period of the mown goods in the separating device and the most compete separation of the grain as possible.

Of course, the conveying speed also can be affected by the rotational speed of the conveying element 8. With increased rotational speed of the conveying element 8, the conveying speed not only increases but also the centrifugal force, and therewith, the force on the useable material, which drives its separation. Simultaneously, however, the retention period of the mown goods in the separating device increases. The best rotational speed of the conveying element is that, with which the separating force and the retention period achieves a common optimum.

The lower region of the housing 7 is formed by the separating cage 10, which has openings with adjustable dimensions. The structure of this separating cage 10 is described in greater detail subsequently with reference to FIGS. 2 and 3.

Grains, chaff and fine chaff, which are thrown out through the openings of the separating cage 10 from the separating device 6, fall onto a so-called return floor 12. This return floor 12 is shakingly moved, so that the collected material on it is conveyed in the driving direction of the combine in the direction of the arrow P2 and finally meets with the grain already separated in the threshing device 2 on the conveyor floor 11, in order to form a material flow, which is designated here as a pre-cleaned flow.

The coarse straw that is removed to the greatest possible extent from the grain during the process through the separating device 6 is thrown out on the rearward end of the separating device 6 and falls through a chute 13 back onto the floor.

The threshing device 2 and the separating device 6 thus form a first separating stage, which, on the one hand, runs the pre-cleaned flow and on the other hand, runs a first waste material flow comprising threshed out straw.

A second separating stage or cleaning stage is essentially formed from a blower 14 and a group of sieve floors 15 lying in a wind current of the blower 14, which are driven in a frame (not shown) to an oscillating movement and are fed with the pre-cleaned flow. The grain contained in the pre-cleaned flow trickles through the oscillating sieve floors 15 onto a closed-off first conducting floor 16. On the lower end of the conducting floor 16, a conveying worm 17 is arranged, which conveys the grain to an elevator (not shown) and via this, into a grain tank (not shown).

Light-weight components of the pre-cleaned flow are taken along during the sieve by the wind of the blower 14 and are separated as a second waste flow on the floor. Components of the pre-cleaned straw, which have traversed the sieve floors 15 on their entire length, without sifting through or being taken away by the blower wind, fall finally on a second closed-off conducting floor 18 and are conveyed from a conveying worms 19 disposed on its lower end back to the threshing device 2 or to the separating device 6, in order to pass through this anew.

Figure 2:
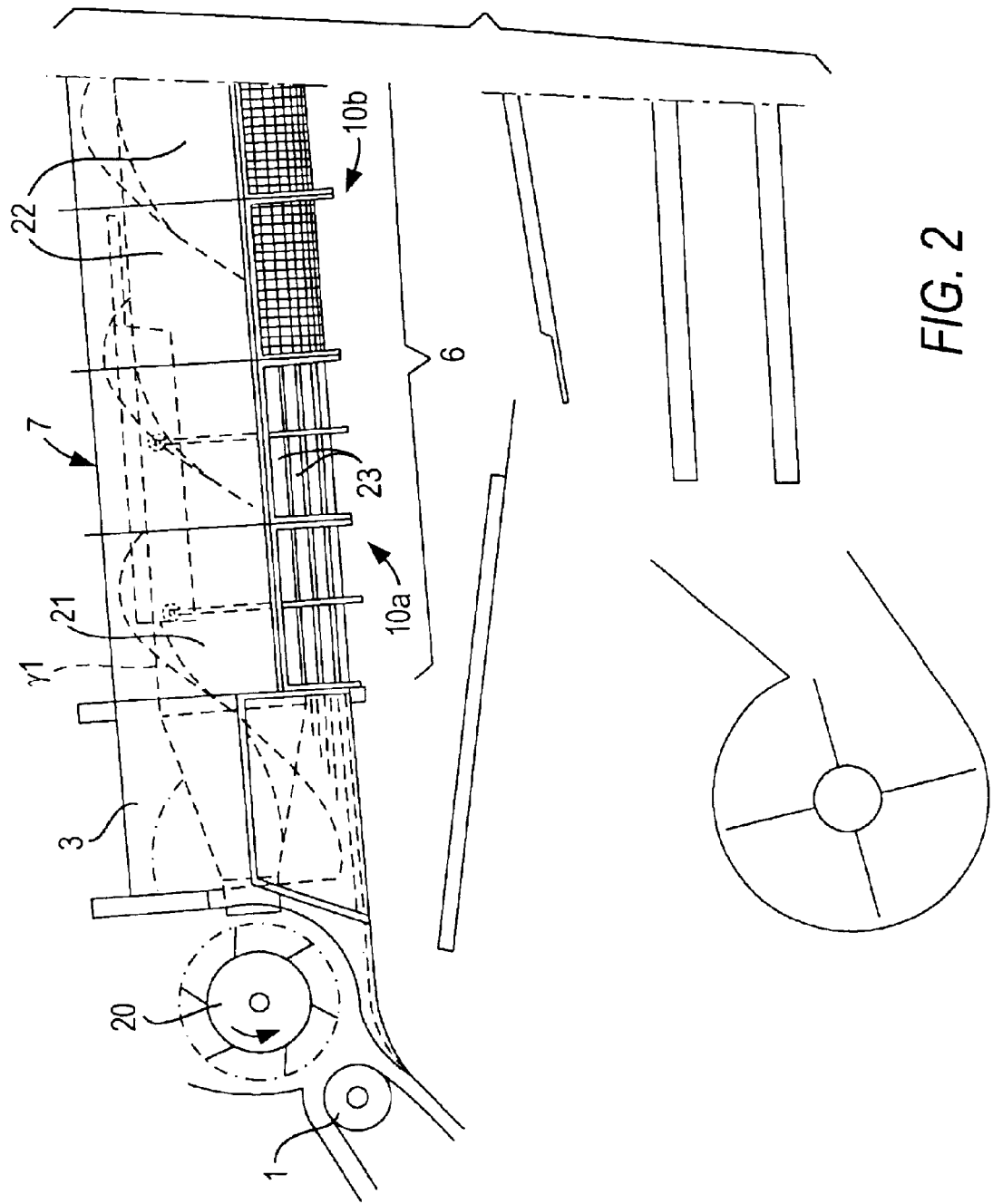
FIG. 2 shows an enlarged detail of the combine of the combine of FIG. 1.

FIG. 2 shows a part of a second embodiment of a combine of the present invention. It differs from the embodiment of FIG. 1 in that the threshing drum 3 of the separating device 6 is advanced in the axial extension, and that between the transporter 1 and the threshing drum, a conveying worm 20 is disposed transverse to the drive direction of the combine for snatching up the crop goods in a lateral direction and supplying it to the entry of the threshing device 3. The structure of the separating device 6 and the subsequent second separating step is the same as with the embodiment of FIG. 1.

As can be seen in detail in FIG. 2, the housing 7 of the separating device 6 comprises multiple axially successive segments 21, 22, which differ in the separating cage 10a, 10b mounted in their lower region. While the separating cage 10b of the rear segments 22 are formed in the common manner by a wire grid, whose opening have fixed dimensions, the separating cages 10a of the forward segments 21 have a plurality of lamella 23 staggered in the circumferential direction. As can be seen in the cross section of FIG. 3, the lamella, respectively, can be pivoted about an axis parallel to the longitudinal axis of the conveying worm 8 and multiple, adjacent lamella 23 are coupled, respectively, by four-joints, so that their pivoting position is controlled by a common linear actor 24. The degree of the angular position of the lamella 23 affects, for one, the width of the gaps between the lamella 23 and, therewith, the free cross sectional surface, over which grain and fine straw can leave from the separating device, and for another, the degree, in which free edges of the lamella 23 project into the separating device 6 and form impingement surfaces for the crop goods, on which these are additionally minimized and threshed.

In FIG. 3, the lamella 23 of four groups controlled by a common linear actor 24 are combined. An electronic control unit 25 controls the pivoting position of each group of lamella 23 independently from the others. About the housing 7, grain sensors 26 are arranged, such that they are contacts by grain escaping from between the lamella of a group. These act as acoustic sensors, which register noise caused by escaping grain, and the control unit 25 connected with them count the impulses caused by the escaping grain per unit time and measures in this way the amount of grain escaping each group of lamella 23.

The conveyer floor 11, on which the exiting grains finally fall, is subdivided into four fields 11a through d, for example corresponding to the groups of lamella 23 in the transverse direction, which respectively catch the grain exiting from a group of lamella and further convey it to the sieve floor 15. Under the sieve floor 15, further grain sensors 27 in a number corresponding to the number and arrangement of groups of lamella are placed. Also, these are connected with the control unit 25, which is in a position with reference to the impulses run from it to evaluate, for one, the grain flow rate of the sieve floor 15, and for another, by comparing the signals from the different grain sensors 27, to evaluate the distribution of the grain over the width of the sieve floor 15. When an unequal distribution is determined, the control unit 25 controls the linear actor 24, in order to narrow the gap of a group of lamella 23, which pass through too much or to enlarge the width of other gaps, in order to achieve a uniform distribution of the grain on the sieve floor 15. Local overloading of the sieve floor 15, which can lead to bad cleaning results, is thus avoided.

Figure 4A:
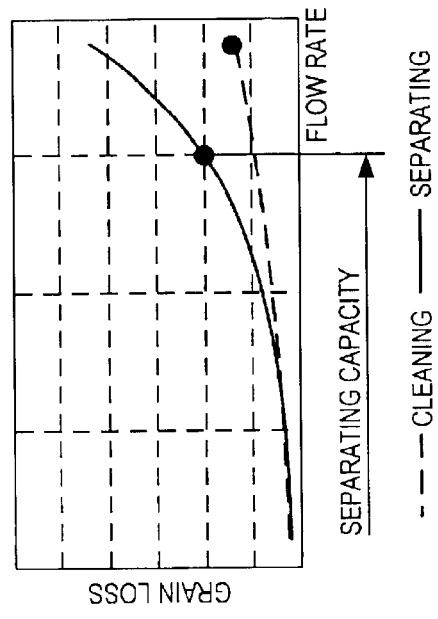
FIG. 4 shows characteristic curves of the grain loss as a function of the flow rate for the different separating stages of the combine with different crop conditions.

Further grain sensors 28, 29 are mounted on the chute 13 or at the exit of the cleaning stage (see FIG. 1), in order to detect the remaining portion of grain in the two waste streams. This remaining portion may not exceed a threshold value of 0.8%, for example, of the amount supplied to the grain tank. In order to use the combine as efficiently as possible, one is advised to drive as fast over the field to be harvested or to remove the crops so quickly that both separating stages work exactly at their respective threshold values. In order to achieve this, the position of the lamella 23 must be different according to the degree of dryness of the crops. When very dry crops with an adjustment adapted for a median drying degree of the crops is processed, the dependency of the grain loss portion on the crop flow rate shown in FIG. 4a is provided. By means of the intense dryness, the crops are easy to thresh and to separate, and the separating step can achieve a high flow rate, before the grain loss in this stage reaches the threshold value of 0.8% or another threshold value favored by the operation of the machine, as shown in the drawn-through curve in FIG. 4a. Simultaneously, however, a large amount of fine straw, also designated as non-grain components, that is, short straw, chaff, and leaf parts, in the cleaning stage, so that its capacity already is achieved with a considerably lower flow rate of the crops, as shown in the dashed curve in this figure. In order not to exceed the grain loss threshold value, then, with this adjustment, the combine must be driven with the flow rate of crops determined by the efficiency of the cleaning stage.

Figure 4B:
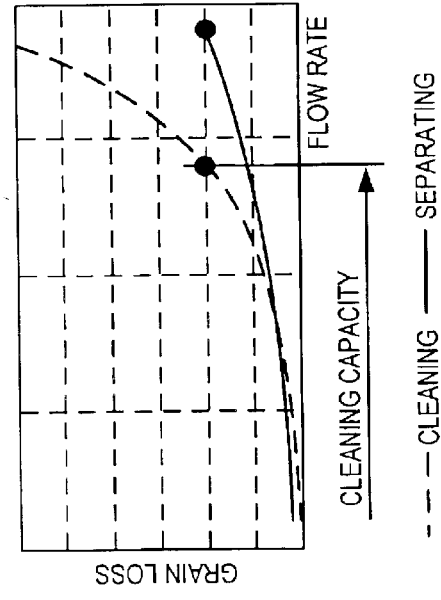

FIG. 4b shows the dependence of the grain loss on the crop flow rate with an optimal adjustment adapted to the dry crops. With this adjustment, the gaps between the lamella 23 are reduced, so that less material penetrates through. In order to still achieve a sufficiently complete separation of the grain, the flow rate of the separating stage must be reduced; in this regard, the conveying speed in the separating device 6 is reduced. Thus, the drawn-through curve in FIG. 4b, which represents the grain loss of the separating stage as a function of the flow rate, the threshold value with a lower flow rate than the corresponding curve of FIG. 4a. At the same time, this position of the lamella leads to conveyance of less fine straw in the cleaning stage. This achieves its capacity therefore first with a substantially higher flow rate than in FIG. 4a. Since the separating stage also first achieves its capacity with this flow rate, the combine can be operated at this higher capacity relative to FIG. 4a.

Figure 4C:
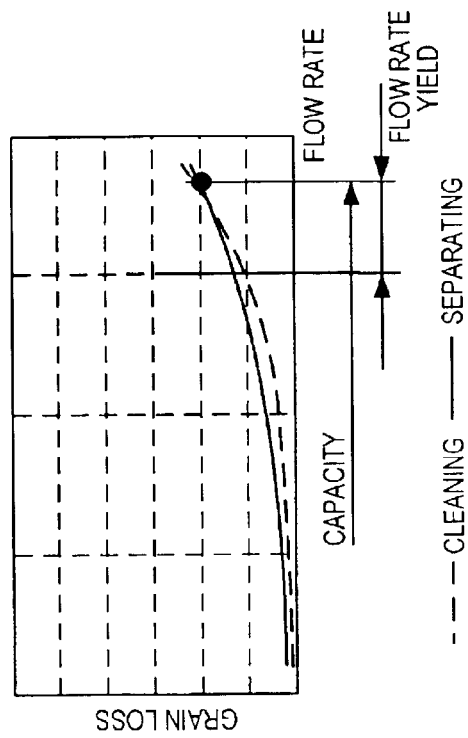
Figure 4D:
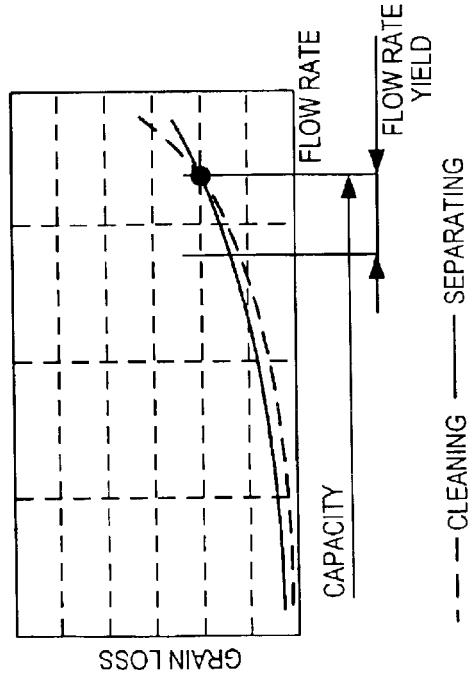

FIG. 4c shows the grain loss from cleaning and separating stages, when the crops to be processed are moister, corresponding to the adjustment of the stages. Here, the separating stage first achieves its capacity and as a whole, limits the crop capacity of the combine. Since little fine straw exists and is moved into the cleaning stage, this stage could process a stronger material flow with a flow rate that corresponds to the capacity of the separating stage, without further, than it actually receives. In this case, according to the invention, the transfer from the separating stage into the cleaning stage is facilitated, in which the gaps between the lamella 23 are widened. In this manner, the capacity of the separating stage increases, and the crop flow rate can be increased up to a value, in which the grain loss of both stages simultaneously reach their threshold, as shown in FIG. 4d.

Figure 5:
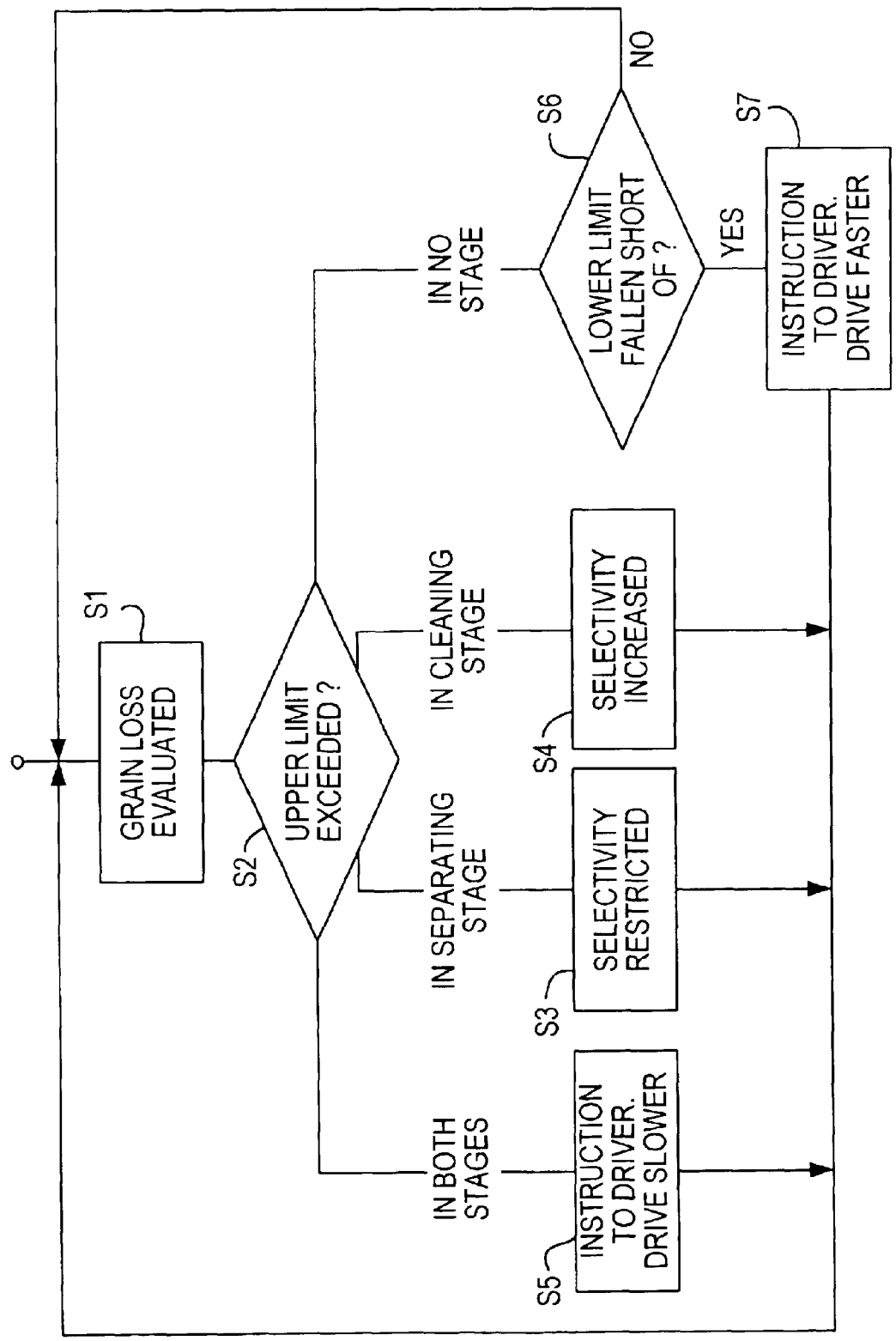
FIGS. 5 and 6, respectively, show a flow diagram of a control method for the combine.

In FIG. 5, a flow diagram of a method is shown, which is processed in the control unit 25, in order to realize the control principle explained with reference to FIGS. 4a through 4d. In a first step S1, the control unit detects the grain loss in the separating and cleaning stage with reference to signals run from the grain sensors 28, 29. In step S2 the loss evaluated in this manner is compared with the upper limit determined for each stage. If the upper limit is exceeded only in the separating stage, the control unit 25 controls in step S3 the linear actors 24, in order to reduce its selectivity and pass through more material in the cleaning stage. When the upper limit is exceeded only in the cleaning stage, conversely, in step S4, the selectivity is increased, in order to relieve the cleaning stage. In this manner, the degree of increase or reduction can be selected, respectively, proportionally to the degree of exceeding of the threshold value, in order to guide back the grain loss as quickly as possible into the target area, or it can be processed with fixed increments or decrements, and the correction of the selectivity is repeated as often as necessary to bring the loss into the allowable range.

When the loss in both stages exceeds the allowable upper limit, this cannot be compensated by a change of the selectivity; in this case, in step S5, a message is displayed to the driver of the combine to reduce the speed of the combine and in this manner, to limit the flow rate of the crops. When the upper limits of the grain loss are not exceeded in any stage, in step S6, it is checked whether, instead, in at least one stage, a lower limit is fallen short of, which lies at a percent or a tenth of one percent beneath the corresponding upper limit. When this is not the case, the selectivity and the speed of the combine are adjusted correctly, and the method reverts directly to step S1. When a falling-short is determined, this means that the combine works beneath its capacity and therefore is inefficient. In step S7, a command is displayed to the driver to increase the speed of the combine, in order to increase the flow rate of the crops.

Figure 6:
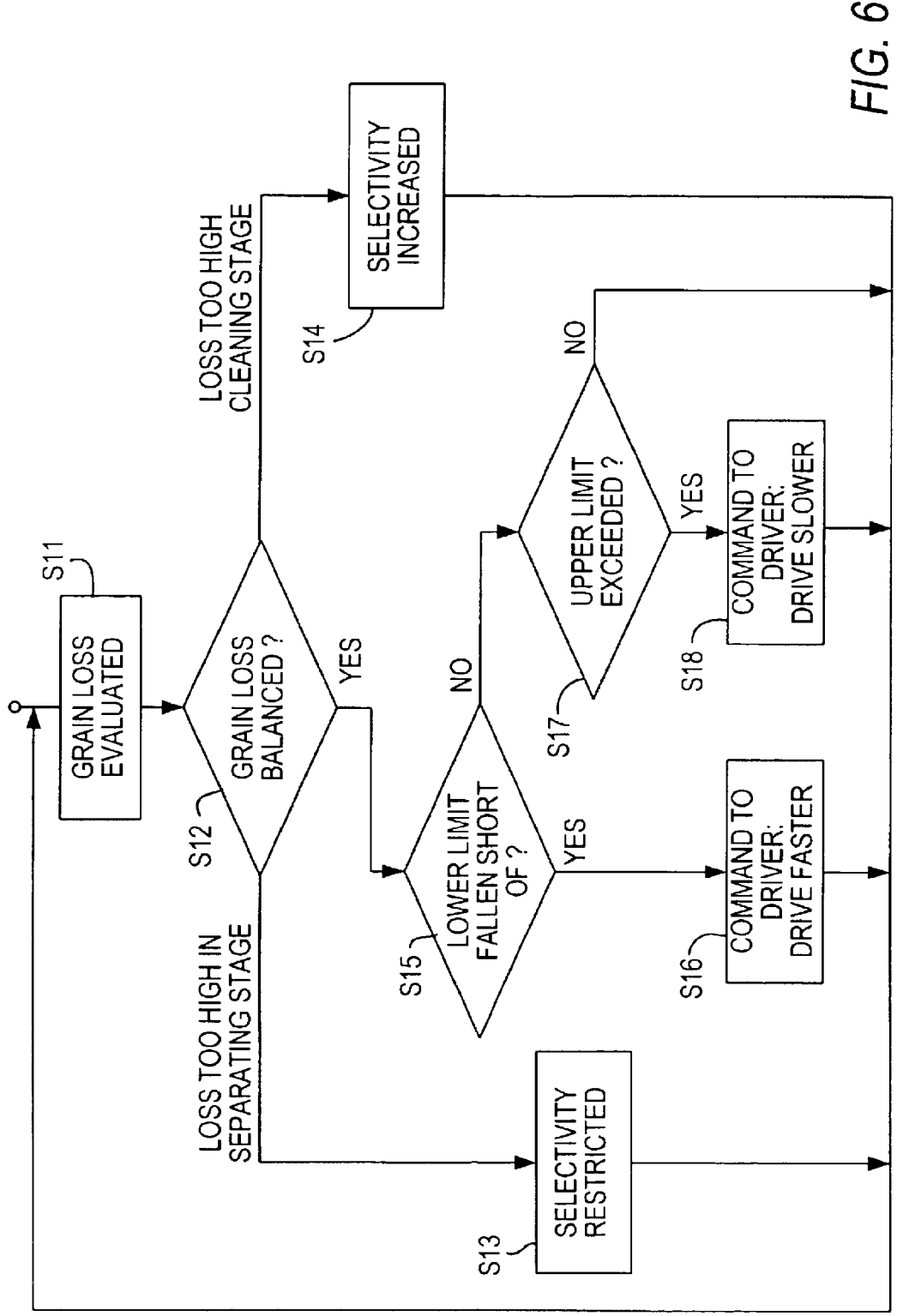

FIG. 6 shows a modification of the control method. Here, first instep S11, the grain loss of both stages is evaluated. Step S12 checks whether the losses in both stages are balanced, that is, it is checked if the losses in a stage lie in an interval defined as a function of the evaluated loss of the other stage. The interval can be defined according to diverse criteria, for example, so that a predetermined entire loss of both stages is not exceeded, that the energy use if minimized, etc. If the losses in one or both directions are not balanced, first in steps S13 or S14, the selectivity is corrected. When the losses are accepted as balanced after eventually repeating these steps, it is checked (S15) whether the lower limit of the losses is fallen short of. If this is the case, a command is displayed to the driver to drive faster; if this is not the case, in step S17, the compliance with the upper limit is check and, if necessary, the drive is advised (S18) to drive slower.

It will be understood that each of the elements described above, or two or more together, may also find a useful application in other types of constructions differing from the types described above.

While the invention has been illustrated and described herein as a method and device for separating a flow of crops, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

Reference Numeral List 1 transporter
2 threshing device
3 threshing drum
4 threshing cage
5 conducting drum
6 separator
7 housing
8 conveying element
9 rib
10 separating cage
11 conveyor floor
12 return floor
13 chute
14 blower
15 sieve floor
16 1. conducting floor
17 worm
18 1. conducting floor
19 worm
20 worm
21 segment
22 segment
23 lamella
24 linear actuator
25 control unit
26 grain sensor
27 grain sensor
28 grain sensor
29 grain sensor

We claim:

1. A method for separating a flow of crops containing useful material and waste material into a useful material flow and a waste material flow, wherein in the useful material flow, the useful material is concentrated and in the waste material flow, the waste material is concentrated, comprising the following steps:

separating the flow of crops into a pre-cleaned flow containing a substantial portion of the useful material and a remaining portion of the waste material with a first selectivity and a first waste material flow containing a substantial portion of the waste material and a remaining part of the useful material;

separating the pre-cleaned flow with a second selectivity depending on its flow rate into the useful material flow and a second waste material flow containing a substantial portion of waste material and a remaining portion of the useful material;

detecting continously at least one quantity of the amount of useful material flow combined into the waste material flow; and controlling the first selectivity based on the at least one quantity independently from the flow rate of the flow of crops.

2. The method according to claim 1, wherein a quantity of the combined amount of the useful material with one of the two waste material flows is detected.

3. The method according to claim 1, wherein in the amount of useful material contained in a waste material flow is detected by measurement of the waste material flow after the separating step.

4. The method according to claim 1, wherein the amount of useful material contained in a waste material flow is detected based on a measurement of the material flow rate of the separating step, which the waste material flow provides.

5. The method according to claim 1, wherein in the second separating step, a remaining flow is separated, which is again supplied to the first separating step.

6. The method according to claim 5, wherein the amount of useful material contained in the second waste material flow is detected based on a measurement of the material flow rate of the remaining flow.

7. The method according to claim 1, wherein the first selectivity is increased when an upper limit of the useful material portion is exceeded in the second waste material flow.

8. The method according to claim 1, wherein the first selectivity is restricted when an upper limit of the useful material in the first waste material part is exceeded.

9. The method according to claim 1, wherein upper limits for both waste material flows are defined to be equal or unequal.

10. The method according to claim 1, wherein the flow rate of the flow of crops is reduced when it is determined that the portion of the useful material in both waste material flows exceeds a threshold value, and wherein the flow rate is increased when the portion falls below a threshold value.

11. The method according to claim 9, wherein the method is used in a driven crop machine and wherein for increasing and/or reducing the flow rate of the flow of crops, a driving speed of the crop machine is adapted.

12. The method according to claim 11, wherein the driving speed of the crop machine is controlled automatically.

13. The method according to claim 11, wherein a direction to a user of the crop machine is produced for increasing or reducing the speed of the crop machine.

14. The method according to claim 1, wherein the flow of crops comprises grain stalks, the useful material flow substantially comprises grain, and the waste material flow substantially comprises non-grain components.

15. A device for separating a flow of crops containing useful material and waste material into a useful material flow and a waste material flow, wherein in the waste material flow, the useful material is concentrated and wherein in the waste material flow, the waste material is concentrated, with a first separating stage (2, 6), in which the flow of crops is separated with a first selectivity into a pre-cleaned flow, which contains a substantial portion of the useful material and a remaining portion of tile waste material, and a first waste material flow, which contains a substantial portion of the waste material and a remaining portion of the useful material, and a second separating stage (11, 12, 14, 15), in which the pre-cleaned flow is separated with a second selectivity dependent on its flow rate into the useful material flow and a second waste material flow, which contains a substantial portion of waste material and a remaining part of the useful material, wherein the device includes at least one sensor (28, 29) for detecting a combined quantity of the amount of useful material with the waste material flows and means (23, 24, 25, 9) for controlling the first selectivity independently from the flow rate of the flow of crops.

16. The device according to claim 15, wherein the means for controlling the first selectivity includes a control unit (25), wherein the control unit is connected to the at least one sensor (28, 29) and elements of the first separating stage that can be controlled by the control unit (25).

17. The device according to claim 15, wherein the device is a drivable crop machine.

18. The device according to claim 17, wherein the control unit (25) is coupled to a drive assembly of the device, in order to reduce the speed of the device when the portion of the useful material exceeds a threshold value in both waste material flow and/or to increase the speed when the portion of the useful material falls below a threshold value.

19. The device according to claim 17, wherein the control unit (25) is coupled to a display element of the device in order to display to a user a request to reduce the speed of the device when the portion of the useful material in both waste material flows exceeds a threshold value or to increase the speed when the selectivities fall below a threshold value.

20. The device according to claim 15, wherein the first separating stage (2, 6) includes a rotor (8) covered at least over a part of its circumference by a cage (10a).

21. The device according to claim 15, wherein the first separating stage (2, 6) includes a rotating drum with a downstream horde shaker.

22. The device according to claim 20, wherein a parameter that can be regulated is the cross section of through-openings of the cage (10a).

23. The device according to claim 20, wherein a parameter that can be regulated is the incline of a rotatable rib (9) with reference to a rotor (18) of the first separating stage (2, 6).

24. The device according to claim 15, wherein at least one of the sensors (28, 29) is associated with one of the waste material flows in order to measure a useful material portion in this flow.

25. The device according to claim 15, wherein at least one of the sensors (26, 27) is associated to one of the separating stages, in order to measure its flow rate, end wherein the control unit is oriented to detect the useful material portion in the waste material flow produced from this separating stage based on the flow rate.

26. The device according to claim 15, wherein the second separating step produces a remaining material flow, which is supplied again vie a return channel (18, 19) to the first separating stage (2, 6).

27. The device according to claim 26, wherein at least one of the sensors is associated with the return channel for detecting the flow rate of the remaining material flow, and wherein the control unit is oriented to detect the useful material portion in the waste material flow produced from the second material stage (11, 12, 14, 15) based on the flow rate.

* * * * *